United States Patent [19]

Odaka et al.

[11] Patent Number: 4,875,111
[45] Date of Patent: Oct. 17, 1989

[54] APPARATUS FOR REPRODUCING A DIGITAL SIGNAL

[75] Inventors: Kentaro Odaka, Tokyo; Tadashi Fukami; Shinya Ozaki, both of Kanagawa, all of Japan

[73] Assignee: Sony Corporation, Tokyo, Japan

[21] Appl. No.: 87,093

[22] Filed: Aug. 19, 1987

[30] Foreign Application Priority Data

Aug. 21, 1986 [JP] Japan ............................ 61-196020

[51] Int. Cl.$^4$ ............................................ G11B 15/14
[52] U.S. Cl. ........................................ 360/64; 360/8; 360/32
[58] Field of Search .................. 360/64, 84, 9.1, 8, 360/32, 10.1, 10.2

[56] References Cited

U.S. PATENT DOCUMENTS

| | | | |
|---|---|---|---|
| 3,157,738 | 11/1964 | Okamura | 360/9.1 |
| 4,282,551 | 8/1981 | Kanazawa et al. | 360/32 |
| 4,346,397 | 8/1982 | Ota | 360/84 X |
| 4,510,538 | 4/1985 | Sato et al. | 360/9.1 X |
| 4,544,958 | 10/1985 | Odaka | 360/32 X |
| 4,617,599 | 10/1986 | Noguchi et al. | 360/32 |
| 4,626,932 | 12/1986 | Müller | 360/84 X |
| 4,628,373 | 12/1986 | Takahashi et al. | 360/32 X |
| 4,670,796 | 6/1987 | Kobayashi et al. | 360/32 X |
| 4,675,754 | 6/1987 | Endo et al. | 360/32 |

FOREIGN PATENT DOCUMENTS

| | | |
|---|---|---|
| 0115699 | 8/1984 | European Pat. Off. |
| 0178589 | 4/1986 | European Pat. Off. |
| 0178905 | 4/1986 | European Pat. Off. |
| 0191469 | 8/1986 | European Pat. Off. |
| 1474487 | 8/1979 | Fed. Rep. of Germany ......... 360/84 |
| 0147125 | 9/1982 | Japan ................................... 360/84 |

OTHER PUBLICATIONS

"Rotating Digital Audio Tape (R—DAT): A Format Overview", P. A. Dare and R. Katsumi, *SMPTE Journal*, Oct. 1987, pp. 943–948.

"Servo Technology of R—DAT", A Hitomi and T. Taki, *IEEE Transcations on Consumer Electronics*, vol. CE—32, No. 3, Aug. 1986, pp. 425–432.

"The DAT Conference, Its Activities and Results", H. Nakajima and M. Kosaka, *IEEE Transactions on Consumer Electronics*, vol. CE—32, No. 3, Aug. 1986, pp. 404–415.

"Exclusive Test Report Four DAT Recorders", L. Feldman, *Audio*, Jul. 1987, pp. 36–47.

*Primary Examiner*—Eugene R. Laroche
*Assistant Examiner*—Seung Ham
*Attorney, Agent, or Firm*—Philip M. Shaw, Jr.

[57] ABSTRACT

In an apparatus for reproducing a digital signal wherein a signal is read by a plurality of reproducing rotary heads which trace a track with an interval narrower than the interval of tracks formed on a tape, a wrap angle with which a tape is wrapped around the periphery of a rotary drum to which the rotary heads are attached is selected to be less than 360°/n with respect to the number n (n is an integer) of rotary heads, the rotary heads are rotated at a speed twice the normal rotational speed of the heads, the demodulated digital signal is stored in a memory corresponding to a frame address and a block address detected from the reproduced digital signal, and then the digital signal stored in the memory is read out therefrom in a predetermined order, whereby an apparatus for correcting the tracking of the tape by the rotary heads can be eliminated.

10 Claims, 5 Drawing Sheets

FIG. 8

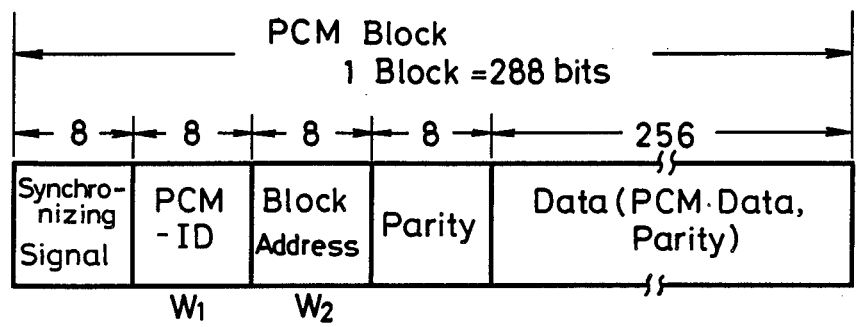

```
         PCM Block
       1 Block = 288 bits
  8    8     8     8      256
┌─────┬────┬──────┬──────┬──────────────┐
│Synchro-│PCM │Block │      │Data(PCM Data,│
│nizing  │-ID │Address│Parity│  Parity)    │
│Signal  │    │      │      │             │
└─────┴────┴──────┴──────┴──────────────┘
        W₁    W₂
```

FIG. 9

| W₁ (PCM-ID) | | | W₂ (Block Address) |
|---|---|---|---|
| ID-1 | ID-2 | Frame Address | 0 X X X 0 0 0 |
| Optional | Code | | 0 X X X 0 0 1 |
| ID-3 | ID-4 | Frame Address | 0 X X X 0 1 0 |
| Optional | Code | | 0 X X X 0 1 1 |
| ID-5 | ID-6 | Frame Address | 0 X X X 1 0 0 |
| Optional | Code | | 0 X X X 1 0 1 |
| ID-7 | ID-8 | Frame Address | 0 X X X 1 1 0 |
| Optional | Code | | 0 X X X 1 1 1 |

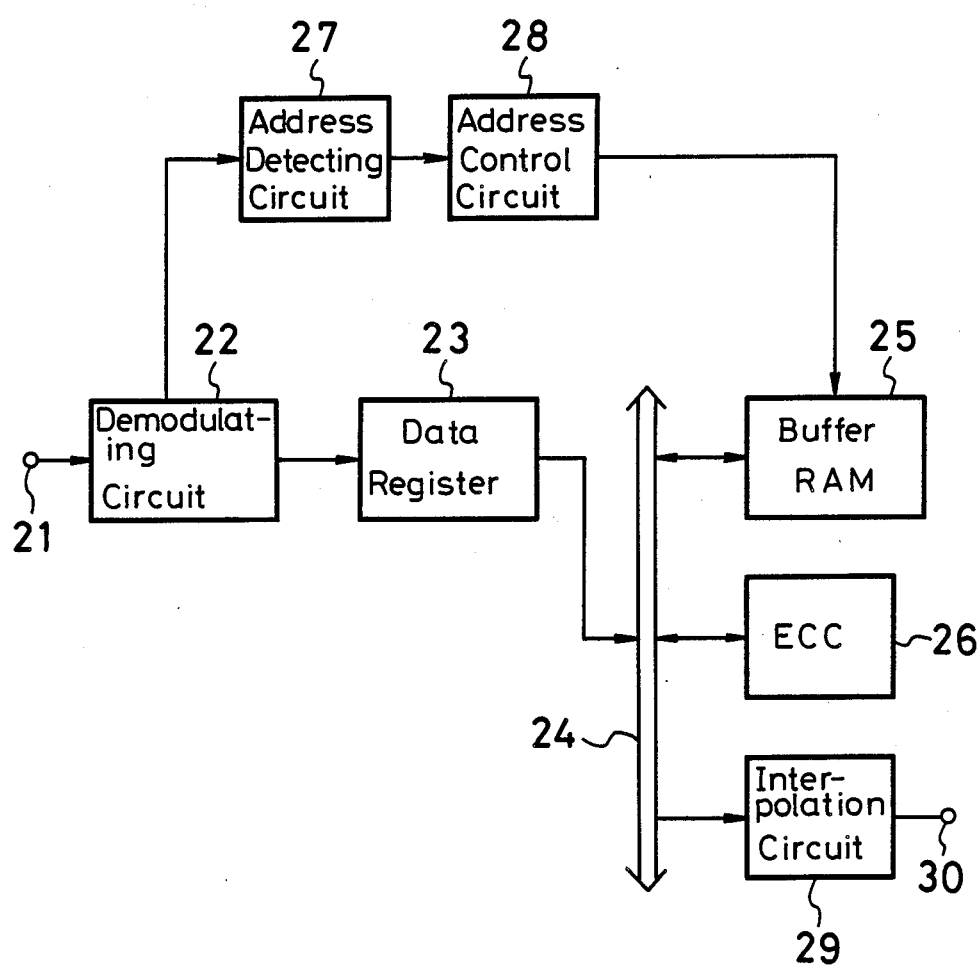
F I G. 10

APPARATUS FOR REPRODUCING A DIGITAL SIGNAL

BACKGROUND OF THE INVENTION

1. Field of the Invention

The present invention relates generally to digital signal reproducing apparatus, and more particularly to an apparatus of this kind which reproduces a digital signal recorded on a tape by a rotary head.

2. Description of the Prior Art

Recently, PCM tape recorders which convert an audio signal into a pulse code modulated (PCM) signal and record the PCM signal on a tape by the use of a rotary head have been proposed. These tape recorders are referred to, for example, as R-DAT. An apparatus for reproducing the PCM signal needs a tracking controller which reproduces a record tracking signal and then controls the running of the tape so that the rotary head exactly scans tracks on which the signals are recorded.

To scan tracks obliquely formed on the tape by a plurality of rotary heads, without employing an ordinary tracking method of the type which detects a pilot signal for the tracking control, there has been proposed a so-called no-tracking system in which a head scans a tape at an interval narrower than the track interval recorded on the tape to read a signal at a speed more than twice the normal speed.

In the above-mentioned no-tracking system, the waving of a bearing for the rotary shaft of a drum and so on can make not only adjacent tracks different in curvature from each other but can also vary the track width. If the variation in the track width becomes large, mistracking can occur. When a tape in which the track width is varied or mistracking has occurred is reproduced, the output level of the reproduced signal is lowered so that the S/N ratio is also deteriorated. To eliminate such defects, as shown in FIG. 1, rotary heads 3A, 3B are respectively mounted on the periphery of a rotary drum 2 connected to a rotation shaft 1 through a head board (not shown) with a sufficiently small angular distance $\theta$, e.g. 1°, relative to the rotating direction thereof, whereby, as shown in FIG. 2, the heads 3A, 3B are controlled to record signals on tracks Ta and Tb obliquely formed on a magnetic tape MT with an azimuth angle in a manner such that the tracks Ta and Tb are parallel to each other and the track width thereof is constant. This method is described in Japanese Laid-open Patent Publications Nos. 59-2205 and 59-177712.

A problem in such a conventional no-tracking method as mentioned above is that since the rotary heads 3A and 3B contact with the tape substantially at the same time, signals reproduced by the rotary heads 3A and 3B must be simultaneously processed at the reproducing side. It is therefore required to provide at the reproducing side two sets of signal processing circuits, such as demodulating circuits, corresponding to the two rotary heads 3A, 3B, thereby rendering the reproducing circuit arrangement complicated.

OBJECTS AND SUMMARY OF THE INVENTION

Accordingly, it is an object of the present invention to provide an improved apparatus for reproducing a digital signal.

It is another object of the invention to provide an apparatus for reproducing a digital signal which has its circuit arrangement simplified and is small in size.

According to one aspect of the invention, there is provided apparatus for reproducing a digital signal recorded in a track formed on a tape by a rotary head, comprising a rotary drum, n rotary heads, driving means for rotating the n rotary heads at a speed twice the normal speed of an R-DAT, e.g. approximately 4000 rpm, guiding means for wrapping the tape on the periphery of the rotary drum with a wrap angle of 360°/n; and demodulating means, supplied with all digital signals reproduced by the n rotary heads, for sequentially demodulating digital signals reproduced by each of the rotary heads.

These and other objects, features and advantages of the present invention will become more apparent from the following detailed description of the preferred embodiment taken in conjunction with the accompanying drawings, throughout which like reference numerals designate like elements and parts.

BRIEF DESCRIPTION OF THE DRAWINGS

FIG. 8 is a diagram showing a PCM block format thereof;

FIG. 9 is a table showing formats of symbols $W_1$ and $W_2$ in a PCM block; and FIG. 10 is a circuit block diagram showing a practical example of the reproduced signal processing circuit appearing in FIG. 6.

DESCRIPTION OF THE PREFERRED EMBODIMENT

Figure 1:
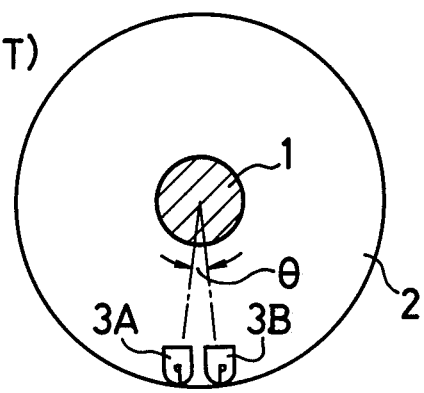
FIG. 1 is a representation of a rotary head assembly of a previously proposed apparatus.
Figure 2:
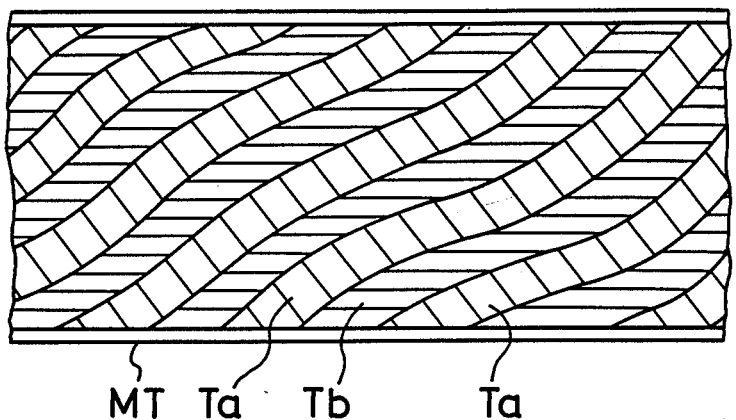
FIG. 2 is a representation of a track pattern on a magnetic tape by the rotary head assembly shown in FIG. 1.
Figure 3:
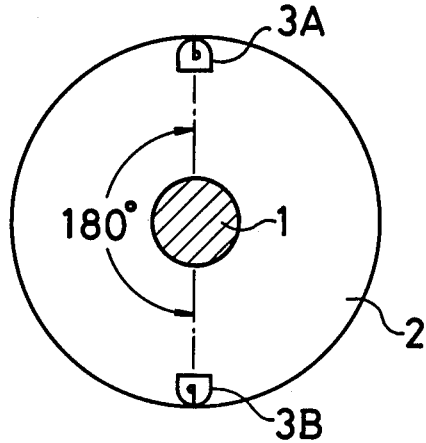
FIG. 3 is a representation of a rotary head assembly of an embodiment of the present invention.

First, the principle of the present invention will be explained with reference to FIGS. 3 to 5.

A conventional system, as disclosed in Japanese Laid-open Patent Publication No. 59-2205, requires the rotary heads 3A and 3B to be mounted substantially at the same position on the rotary drum so as to make constant the width of tracks on which signals are recorded. However, when an apparatus which is used exclusively for the reproduction of the signals is involved, i.e. an R-DAT player, the rotary heads 3A and 3B can be mounted at more desirable positions on the periphery of the rotary drum since the difference between the traces by the rotary heads 3A and 3B does not cause any problem. Therefore, in the present invention, as shown in FIG. 3, the rotary heads 3A and 3B are mounted on the periphery of the rotary drum 2 with an angular distance of 180° so that the two rotary heads 3A and 3B are diametrically opposed.

Figure 4:
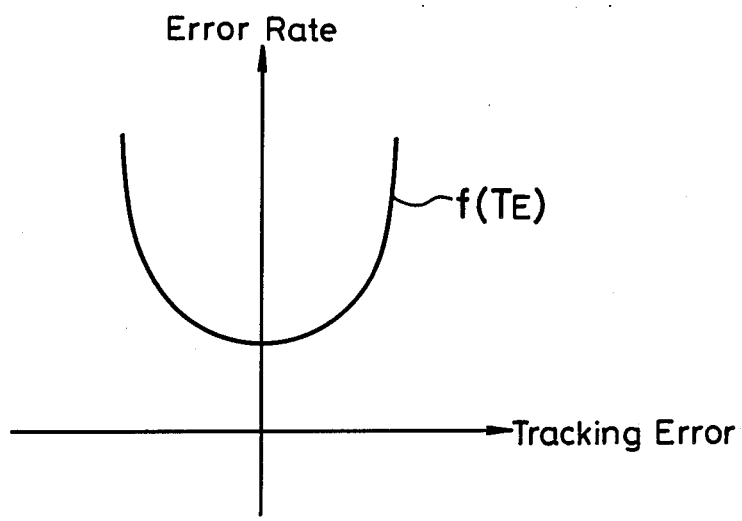
FIG. 4 is a graph showing the characteristic of a normal tracking system.
Figure 5:
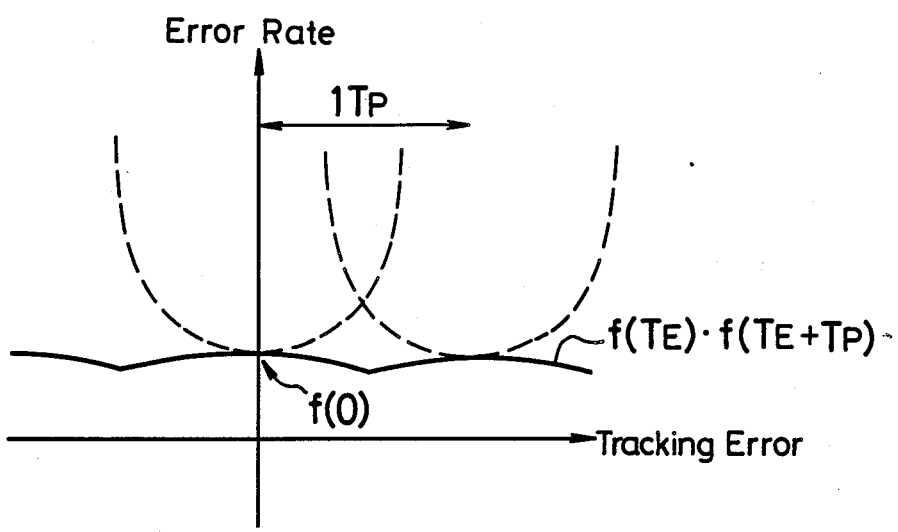
FIG. 5 is a graph showing the characteristic of a non-tracking system.

The normal tracking system has an error rate to tracking error characteristic as shown in FIG. 4. On the other hand, as shown in FIG. 5, the no-tracking system can always reduce the error rate to below f(0) totally, regardless of the head mounting position, if the rotary heads are rotated at a speed twice the ordinary recording speed to scan tracks at more than twice the normal recording speed and read signals at more than twice the normal recording speed.

In the case where n rotary heads are provided, the condition that the n rotary heads are not simultaneously in contact with a tape will be satisfied if a tapewrap angle is selected to be below $360°/n$. More specifically, assuming that the number n of rotary heads for recording signals with plus or minus azimuth angle is selected as $2m$ ($n=2m$) and a normal, reference rotational speed of the drum is k, the tapewrap angle should be selected to be $2k/m$. For example, with $m=1$ and $k=2000$ rpm, the drum rotational speed is calculated to be 4000 rpm. In this case, if there are two heads mounted on the periphery of the rotary drum, these heads are separated by an angular distance of 180°, that is, the two heads are respectively mounted on the periphery of the rotary drum at positions diametrically opposite to each other and the tapewrap angle is set to be below 180° ($360°/2$).

Next, the circuit arrangement of an embodiment of the present invention and the operations thereof will be explained with reference to FIG. 6.

Figure 6:
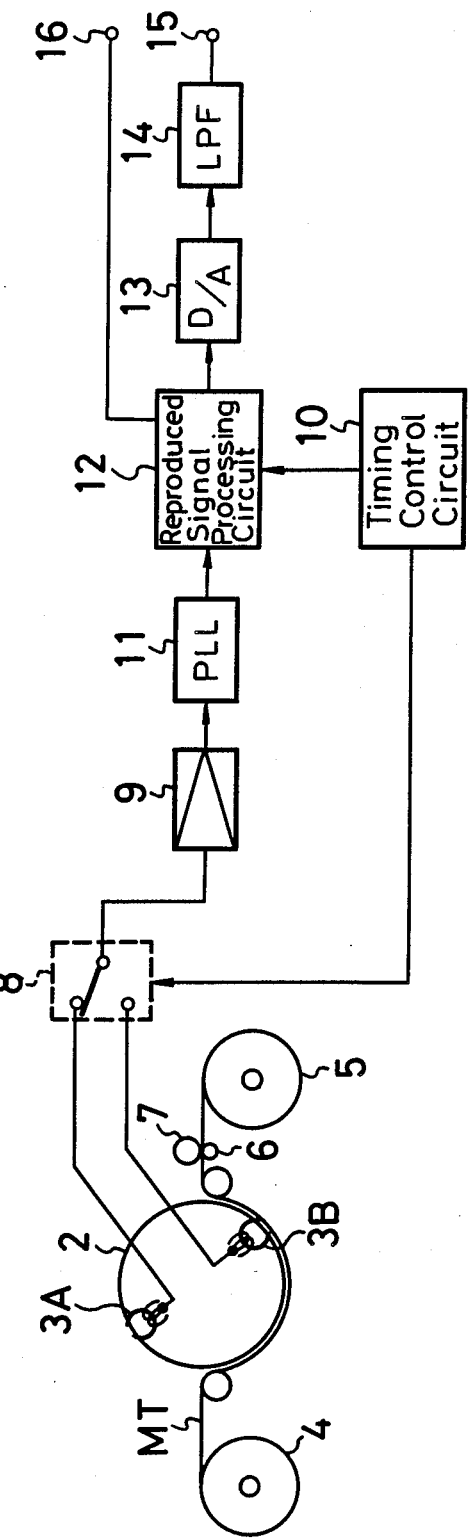
FIG. 6 is a circuit block diagram showing an embodiment of the present invention.

FIG. 6 shows the circuit arrangement of an apparatus according to the present invention which reproduces a signal recorded on a tape by an ordinary R-DAT. For the purposes of this embodiment, a reference diameter for an ordinary DAT would be 30 mm. In FIG. 3, a rotary drum 2, the diameter of which is half that of the ordinary R-DAT, e.g., 15 mm, is rotated at a speed twice the normal speed of the R-DAT, e.g., 4000 rpm. A pair of rotary heads 3A and 3B are mounted on the periphery of the rotary drum 2 with an angular distance of 180°. A magnetic tape MT is obliquely wrapped around the outer periphery of the rotary drum 2 with a wrap angle of 180°. Another embodiment of the apparatus may also be considered in which, if the diameter of the rotary drum 2 is 30 mm, the tapewrap angle is selected to be 90° and the rotary drum 2 is rotated at a speed twice the normal speed of the R-DAT, that is, 4000 rpm. The magnetic tape MT is stretched between a reel hub 4 and the other reel hub 5 provided in a tape cassette and transported at the predetermined normal speed of the R-DAT by a capstan 6 and a pinch roller 7.

In the aforementioned ordinary R-DAT, the rotary drum having a pair of heads mounted with an angular distance of 180° on the periphery thereof, has a diameter of 30 mm and is rotated at 2000 rpm. The magnetic tape is wrapped around the outer periphery of the rotary drum with a wrap angle of 90°.

With this R-DAT, two oblique tracks are formed on the magnetic tape MT by the rotary heads which are alternately in contact with the magnetic tape MT. The directions of the magnetic gap of the magnetic heads are respectively chosen to be $+\alpha$ ($=20°$) and $-\alpha$ relative to the direction perpendicular to the direction of the track. The angles of the magnetic gaps of the respective rotary heads are referred to as a "plus azimuth" and a "minus azimuth", respectively.

Reference is next made to a reproducing apparatus of the present invention which reproduces a digital signal recorded on a magnetic tape by the above-mentioned ordinary R-DAT.

As shown in FIG. 6, the rotary heads 3A and 3B are alternately selected by a change-over switch 8. Signals reproduced by the respective rotary heads 3A and 3B are supplied to a reproducing amplifier 9 through a rotary transformer and a head amplifier (both not shown). A control signal for controlling the switch 8 is generated by a timing control circuit 10.

The reproduced signals are transmitted at a transmitting speed twice the transmitting speed of the ordinary R-DAT since the rotary heads are rotated at 4000 rpm, that is, a rotational speed twice the rotational speed of the normal R-DAT. The respective tracks formed on the tape are also scanned at twice the scanning rate of the normal R-DAT. Therefore, the rotary heads trace the tracks with an interval half that of the track recorded on the tape.

An output signal from the reproducing amplifier 9 is supplied to a phase locked loop (PLL) circuit 11 wherein a clock signal in synchronism with the reproduced signal is extracted. Signal processing such as error correction, interpolation and so on are effected for the reproduced signal in a reproduced signal processing circuit 12. Then, the reproduced and processed digital audio signal is supplied to a digital to analog (D/A) converter 13. The reproduced audio signal from the D/A converter 13 is delivered to an output terminal 15 through a low pass filter 14. Also in the reproduced signal processing circuit 12, a sub-code and a sub-code ID are separated from the reproduced signal and are then delivered to an output terminal 16. To the output terminal 16 there is connected a sub-code decoder (not shown) which generates control data and so on from the sub-code. The timing control circuit 10 generates a clock signal and a timing signal which are required by the reproducing signal processing circuit 12.

Reference is next made to the construction of the data recorded on the tape by the ordinary R-DAT.

Figure 7:
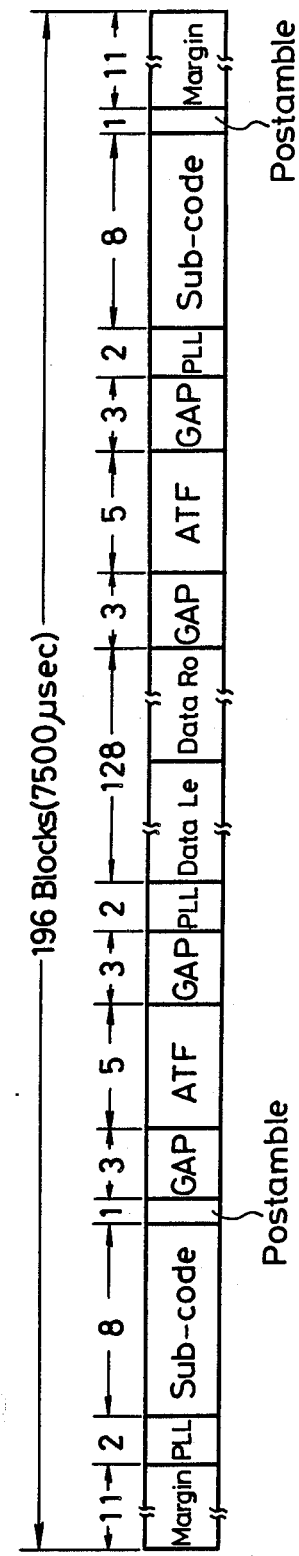
FIG. 7 is a diagram showing a track format of one segment data formed by the invention.

All of the data recorded in one track is called "one segment". FIG. 7 shows the construction of the data recorded in one segment by one of the rotary heads. If a unit amount of the recorded data is determined as "one block", one segment includes the data of 196 blocks (corresponding to 7500 μsec). At both side end portions of one segment corresponding to both side end portions of the track there are respectively provided margins (11 blocks). Sub-codes 1 and 2 (eight blocks) are respectively recorded in portions adjacent to the margins. The contents of the two subcodes 1 and 2 are the same, namely, the same data is double-recorded. The sub-codes may be a program number, a time code, a start identifying signal and so on. At both sides of each of the eight block sub-code recording areas 1 and 2, a PLL run-in interval or portion (two blocks) and a post-amble interval or portion (one block) are respectively located.

There are also provided inter-block gaps (three blocks) in which no data is recorded. A pilot signal for the ATF is recorded in two ATF regions of five blocks which are respectively located at portions between two inter-block gaps. In a central region having a length of 130 blocks in one segment except for the PLL run-in portion of two blocks, that is, in a 128 block length region, the processed PCM signals are recorded. The PCM signals of two segments correspond to audio signals read by the rotary heads during one rotation thereof. The PCM signal comprises two-channel stereo PCM signals consisting of a L (left) channel and a R (right) channel signals and parity data consisting of error detection and error correction codes.

When one segment as shown in FIG. 7 is recorded and/or reproduced by the rotary head 3A, data $L_e$ is recorded in the left half of the PCM signal recording region and data $R_o$ in the right half of the same. The data $L_e$ comprises even-numbered data of the L channel and a parity code for correcting possible errors occurring in the data $L_e$, while the data $R_o$ comprises odd-numbered data of the R channel and a parity code for correcting possible errors occurring in the data $R_o$. Each number of the odd-and even-number indicates a number counted from the head of the interleave block.

One segment of data formed in the same manner as described above is recorded in a track formed by the other rotary head. The data region of one segment in one track formed by the other rotary head is divided into the left half portion for recording data $R_e$ and the right half portion for recording data $L_o$. The data $R_e$ comprises even-numbered data of the R channel and a parity code for correcting possible errors occurring in the data $R_e$. In the same manner, the data $L_o$ comprises odd-numbered data of the L channel and a parity code for correcting possible errors occurring in the data $L_o$. The reasons why the even-numbered data and odd-numbered data of each of the R and L channels are separately recorded in two adjacent tracks and the odd-numbered data and the even-numbered data are recorded in the same track is to prevent data errors from occurring in the successive data of the same channel due to drop-out and so on.

FIG. 8 shows the data construction of one block of the PCM signal. At the head of one block, a block synchronizing signal having an eight bit length (eight bits are referred to as "one symbol") is allocated, which is followed by a PCM-ID (referred to as "$W_1$") of eight bits and a block address portion (referred to as "$W_2$") of eight bits. An error correction coding by a simple parity is effected with regard to the two symbols of the PCM-ID ($W_1$) and the block address portion ($W_2$) and a parity code of eight bits is added after the block address.

Referring to FIG. 9, the block address portion is constituted by seven bits except the most significant bit (MSB). The MSB is set to "0" to indicate that the block is a PCM block.

The block address indicated by seven bits changes sequentially from (00) to (7F) in hexadecimal. The PCM-ID indicative of data recorded in each block is recorded in locations, the block addresses of which are (000), (010), (100) or (110) in the lower three bits. Optional codes of the PCM-ID can be recorded in locations, the block addresses of which are (001), (011), (101) or (111) in the lower three bits. The PCM-ID includes two bits of ID-1 to ID-8 and four bits of frame address. The respective ID-1 to ID-7 respectively show identifying information. A pack or packet is formed of 32 ID-8s (two bits). For example, ID-1, which is a format ID, indicates whether recorded data is for audio or for any other purposes. ID-2 indicates on or off of pre-emphasis and the characteristics of the pre-emphasis, and ID-3 a sampling frequency. The above-mentioned ID-1 to ID-7 and frame address are recorded equally in two segments constituting an interleave pair. In other words, the frame address is incremented by one at every two segments.

Next, a practical example of the reproduced signal processing circuit 12 in FIG. 6 and its operations will be described with reference to FIG. 10.

The reproduced signal is supplied by way of a terminal 21 to a demodulating circuit 22 wherein one symbol formed of ten bits is demodulated to one symbol formed of eight bits. Eight bits of one symbol have been digitally modulated to a suitable pattern of ten bits upon being recorded on the magnetic tape MT so as to reduce low frequency components suitably. The reproduced data from the demodulating circuit 22 is delivered symbol by symbol through a data register 23 to a data bus 24. The data bus 24 is connected with a buffer RAM 25 and an error correction circuit 26. The buffer RAM 25 should have a capacity larger than that of the buffer RAM provided in an ordinary R-DAT, which generally has a capacity for storing data recorded in four tracks, since it is required to store in the buffer RAM 25 data reproduced by the rotary heads which possibly overlap tracks due to omission of the tracking control. The block address and the frame address of the reproduced signal from the signal outputted from the demodulating circuit 22 are detected by an address detecting circuit 27 and supplied to an address control circuit 28. The output signal from the address control circuit 28 is supplied to the buffer RAM 25 as an address signal. The reproduced data is stored via the data bus 24 in the buffer RAM 25 in accordance with the address signal from the address control circuit 28. Therefore, the reproduced data is stored in the buffer RAM 25 in accordance with the block address and the frame address without tracking control. In the error correction circuit 26, error correction is effected by a Reed-Solomon code on each track of data stored in the buffer RAM 25. The reproduced data, after being subjected to the error correction, is read out of the buffer RAM 25 in the original order and the error-corrected PCM signal is supplied to an interpolation circuit 29 wherein uncorrectable errors are interpolated. The reproduced PCM signal is then supplied through an output terminal 30 to the D/A converter 13 shown in FIG. 6. The sub-code is delivered to a sub-code output terminal after processing, such as error correction, in the sub-code decoder (not shown).

Conventionally, two sets of the reproducing amplifier 9, the PLL circuit 11, the reproduced signal processing circuit 12 and so on have been necessary for the rotary heads 3A and 3B. However, according to the embodiment of the invention described above, the tapewrap angle is selected to be less than 180° in order that the rotary heads 3A and 3B will not be simultaneously in contact with a tape, and the rotational speed of the rotary drum 2 is selected to be twice the recording speed of the ordinary R-DAT, so that the number of sets of the reproducing amplifier 9, the PLL circuit 11, the reproduced signal processing circuit 12 and so on can be reduced to one set without the necessity of the tracking control.

It is therefore possible to provide an apparatus exclusively used for reproducing a digital signal constructed by a simple circuit arrangement.

Further, according to the present invention, in the signal processing apparatus of the non-tracking system, the tapewrap angle is selected to be less than 360°/n with respect to the number n of rotary heads mounted on the periphery of the rotary drum and a plurality of rotary heads will not be in contact with a tape at the same time. Thus, the arrangement of the reproducing circuit can be simplified, and consequently the production cost can be reduced.

Further, when the diameter of the rotary drum is made small, a compact-sized apparatus exclusively used for reproducing a digital signal is provided.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. Apparatus for reproducing a digital signal recorded in a track formed on a tape by a recording apparatus having rotary head rotating at a predetermined speed and mounted on a rotary drum having a predetermined diameter, the reproducing apparatus comprising:
   a rotary drum;
   n rotary heads mounted on the rotary drum, where n is an integer;
   driving means for rotating said n rotary heads at a speed at least twice the predetermined rotation speed of the rotary head of the recording apparatus;
   guiding means for wrapping the tape on the periphery of the rotary drum with a wrap angle of 360°/n; and
   demodulating means connected to the rotary heads and supplied with all digital signals reproduced by said n rotary heads during each rotation of each of the rotary heads and for demodulating the reproduced digital signals.

2. Apparatus for reproducing a digital signal as claimed in claim 1, further comprising:
   detecting means for detecting a block address contained in each block and a frame address contained in a block at every predetermined number of blocks from a plurality of blocks forming the digital signal recorded in the track on the tape;
   means for storing a demodulated digital signal of each block in a memory corresponding to the block address and the frame address detected by said detecting means; and
   means for reading the stored digital data from said memory in predetermined order.

3. Apparatus for reproducing a digital signal as claimed in claims 1 or 2, wherein the number of said rotary heads is two, and said guiding means wraps the tape with a wrap angle of approximately 180° for said rotary drum.

4. Apparatus for reproducing a digital signal as claimed in claims 1 or 2 wherein the diameter of said rotary drum of the reproducing apparatus is selected to be half of the size of the diameter of the recording apparatus' rotary drum.

5. Apparatus for reproducing a digital signal as claimed in claim 4, wherein said rotary drum has a diameter of approximately 15 mm and is rotated at approximately 4000 rpm.

6. Apparatus for reproducing a digital signal recorded in a track formed on a tape by a rotary head rotating at a predetermined speed, comprising:
   a rotary drum;
   n rotary heads mounted on the rotary drum, where n is an integer;
   driving means for rotating said n rotary heads at a speed twice the predetermined rotational speed of the rotary recording head;
   guiding means for wrapping the tape on the periphery of the rotary drum with a wrap angle of 360°/n; and
   demodulating means supplied with all digital signals reproduced by said n rotary heads and for demodulating the reproduced digital signals.

7. Apparatus for reproducing a digital signal recorded in a track formed on a tape by a recording apparatus having rotary head rotating at a predetermined speed and mounted on a rotary drum having a predetermined diameter, the reproducing apparatus comprising:
   a rotary drum;
   2 m rotary heads mounted on the rotary drum, where m is an integer;
   driving means for rotating said 2 m rotary heads at a speed twice the rotational speed of the rotary head of the recording apparatus;
   guiding means for wrapping the tape on the periphery of the rotary drum with a wrap angle of 2k/m; where K is a normal reference rotational speed of the drum; and
   demodulating means connected to the rotary heads and supplied with all digital signals reproduced by said 2 m rotary heads during each rotation of each of the rotary heads for demodulating the reproducing digital signals.

8. A method for reproducing a digital signal recorded in a track formed on a tape by a rotary head, comprising the steps of:
   wrapping the tape on the periphery of a rotary drum with a wrap angle of 360°/n;
   rotating n, where n is an integer, rotary heads mounted on the drum at a speed of approximately 4000 rpm. to scan the wrapped tape; and
   sequentially demodulating the digital signals reproduced by each of said n rotary heads.

9. Apparatus for reproducing a digital signal recorded in a track formed on a tape by a rotary head rotating at a predetermined speed, said digital signal consisting of a plurality of blocks, each block having a block address and a frame address, said apparatus comprising:
   a rotary drum;
   n rotary heads mounted on the rotary drum, where n is an integer;
   driving means for rotating said n rotary heads at a speed at least twice the predetermined speed, so that each rotary head is traced with an interval half that of the track recorded on the tape;
   guiding means for wrapping the tape on the periphery of the rotary drum with a wrap angle of 360°/n;
   demodulating means connected to the rotary heads and supplied with all digital signals reproduced by said n rotary heads during each rotation of each of the rotary heads and for demodulating the reproduced digital signals;
   means for generating said block addresses and said frame addresses; and
   memory means for storing said demodulated digital signal blocks in accordance with said generated block addresses and frame addresses, and for reading said stored blocks in accordance with a predetermined sequence of said block addresses and frame addresses.

10. Apparatus for reproducing a digital signal as claimed in claim 9, wherein said memory means has a capacity larger than the capacity for storing said digital signal block recorded in four tracks.

* * * * *